3,326,635
PHOSPHORIC ACID MANUFACTURE

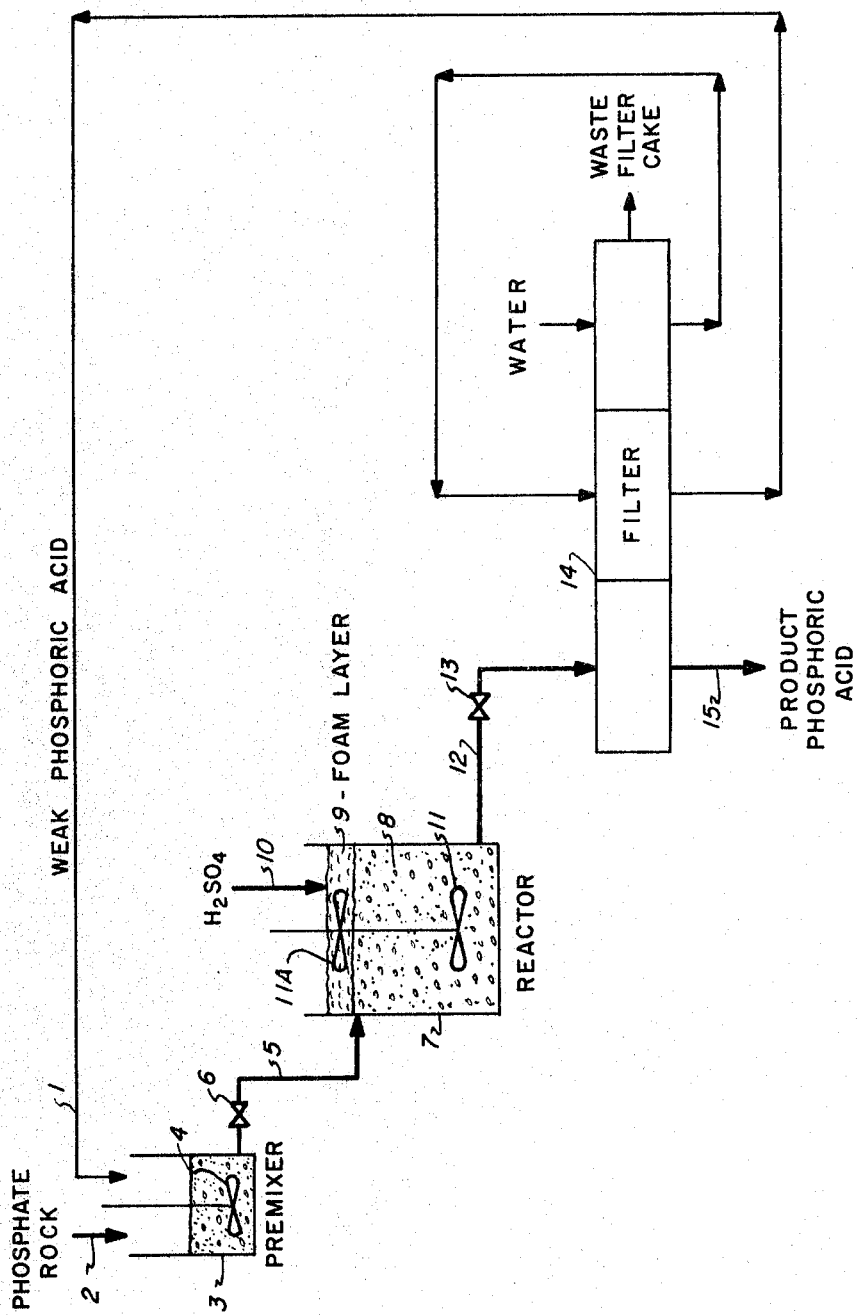

John E. Davenport, Tuscumbia, and Frank Carroll, Sheffield, Ala., assignors to Tennessee Valley Authority, a corporation of the United States
Filed Mar. 25, 1963, Ser. No. 267,868
5 Claims. (Cl. 23—165)

Our invention relates to a method for the manufacture of phosphoric acid by the so-called wet process in which phosphate rock is treated with sulfuric acid, more particularly to a method for the production of wet-process phosphoric acid of high concentration, and more particularly to a process in which conditions are controlled to obtain an acid of high concentration, and still more particularly to a method for the production of wet-process phosphoric acid of high concentration wherein the necessity of adding external heat to the system of said process is substantially eliminated therefrom.

Heretofore it has been the practice in the chemical industry to produce wet-process phosphoric acid by digesting phosphate rock with sulfuric acid in a slurry for as much as 6 to 12 hours so that calcium sulfate crystals resulting from the displacement of the phosphate ion in union with calcium by the sulfate ion can nucleate and grow, removing most of the solids by filtering, washing the filter cake with water to remove the $P_2O_5$, and recycling the wash liquor to the digesting system. As a result of this relatively simple method, manufacture of wet-process phosphoric acid is very economical, although such acid normally contains impurities. These impurities are principally iron and aluminum compounds accompanied by other materials in the phosphate rock which may be soluble in the sulfuric acid. The resulting product acid usually contains only about 30 percent $P_2O_5$. Inasmuch as most of the wet-process phosphoric acid produced by such method is subsequently used in the production of fertilizers by processes which require stronger acid, it is necessary to concentrate same to about 50 to 54 percent $P_2O_5$ before the acid can be utilized.

The chemical fertilizer industry has recognized the desirability of producing, by a direct method, wet-process phosphoric acid from the acidulation of phosphate rock wherein acid of a concentration of approximately 50 percent $P_2O_5$ is produced, thereby eliminating the necessity of supplying heat, such as an evaporating means, to concentrate the fresh product acid containing only about 20 to 30 percent $P_2O_5$ to an acid containing about 50 to 54 percent $P_2O_5$.

A fairly recent breakthrough in the above-mentioned maximum $P_2O_5$ content of wet-process phosphoric acid obtained directly by the acidulation of phosphate rock with either sulfuric acid or a mixture of sulfuric acid and phosphoric acid is shown in U.S. Letters Patent No. 2,504,544, Casimer C. Legal, Jr., et al., Apr. 18, 1950. Legal, Jr., et al. discloses a method for the direct production of a strong phosphoric acid containing up to about 50 percent $P_2O_5$ by means of a wet process which substantially eliminates the necessity of resorting to an evaporation step as disclosed in other prior-art processes. In the teachings of Legal, Jr., et al., a supply of sulfuric acid containing about 98 percent $H_2SO_4$ is heated to a temperature ranging between 100° C .and 300° C., and thence introduced into a pugmill for admixture with finely ground and divided phosphate rock. After the mixing operation, the mixture is passed into an indirectly fired rotary heater in which it is heated to a temperature ranging from about 200° C. to 300° C. for a period of about 10 to 30 minutes with the result of the formation of a calcined or clinker product. The resulting calcined or clinker product is then transported directly, and preferably without substantial cooling, into a system of countercurrent leaching tanks wherein it is dropped directly into strong phosphoric acid. Although the teachings of Legal, Jr., et al. have overcome one of the difficulties present in the prior art, viz. the direct production of a wet-process phosphoric acid containing up to about 50 percent $P_2O_5$, as opposed to the production of wet-process phosphoric acid containing only about 30 percent $P_2O_5$, this process obviously dictates that external heat must be added to the system, and apparently this addition of such heat and the resulting high operating temperature have prevented said process from being economically competitive with the commercial processes produced industrially up to the present time due to excessive corrosion of the plant equipment.

A still more recent breakthrough in the above-mentioned maximum $P_2O_5$ content of wet-process phosphoric acid obtained directly by the acidulation of phosphate rock with sulfuric acid, or a mixture of sulfuric acid and phosphoric acid, is shown in U.S. Letters Patent No. 2,885,264, Robert B. Peet, May 5, 1959. Peet discloses a method for the direct production of a strong phosphoric acid containing up to about 40 to 50 percent $P_2O_5$ by means of a direct wet process which substantially eliminates the necessity of resorting to an evaporation step, as disclosed in other prior-art processes. In the teachings of Peet, ground phosphate rock is digested with strong aqueous phosphoric acid at elevated temperatures with the accompanying careful control of the ratio of sulfuric acid subsequently introduced into the crystallizer to the monocalcium phosphate in said crystallizer. Peet has disclosed that it is possible to obtain a calcium sulfate hemihydrate in the form of hard and compact agglomerates which are free-filtering and easily washable by careful control of the conditions under which these crystals are formed. By carrying out his sulfuric acid treatment of the monocalcium phosphate solutions obtained from the digestion of the ground phosphate rock with strong phosphoric acid under his operating conditions, the filtration and washing steps of the process are greatly facilitated with a corresponding improvement in plant operation. Peet has discovered that a deficiency of sulfuric acid should be maintained in his digester vessel, i.e., the quantity of sulfuric acid introduced should be less than the stoichiometric equivalent of the calcium content of the monocalcium phosphate present, and this deficiency must be maintained within rather narrow limits. Peet teaches that agglomerates of calcium sulfate hemihydrate crystals which are free-filtering and easily washable are obtained when the deficiency of sulfuric acid is maintained within the range of slightly more than 1.5 percent to about 3 percent, and a more favorable range disclosed is from 1.8 percent to 2.8 percent. Although the teachings of Peet have overcome one of the difficulties present in the prior art, viz. the direct production of wet-process phosphoric acid containing about 50 percent $P_2O_5$, as opposed to the production of a wet-process phosphoric acid containing only about 30 percent $P_2O_5$, this process obviously dictates the use of large recycle rates of phosphoric acid, the use of more complex equipment, viz., the use of two digester vessels and two crystallizers, and the use of large quantities of recycled product acid in order to digest the ground phosphate rock. Furthermore, Peet's process requires the recirculation of large quantities of reaction slurry from one of the crystallizers to one of the digesters. Apparently this disclosure has prevented said process from being economically competitive with the commercial processes produced industrially up to the present time.

Our invention is directed to a method of producing directly from the acidulation of phosphate rock with sulfuric acid a wet-process phosphoric acid containing up to about 50 percent $P_2O_5$, by weight, wherein the disadvantageous necessity of supplying external heat to the processes, as shown in the discussion of Legal, Jr., et al., and the disadvantageous necessity of employing the use of concentrated phosphoric acid to digest the phosphate rock, as shown in the discussion of Peet, are eliminated and the above-mentioned disadvantages of other processes disclosed in the prior art are overcome.

We have overcome the difficulties inherent in the processes of the type of the prior art to a substantial extent in the present invention by a process which comprises introducing ground phosphate rock into a digester vessel; maintaining in said digester vessel a slurry resulting from the reaction of sulfuric acid and said phosphate rock, said sulfuric acid introduced into said digester vessel from a later-mentioned addition step; maintaining a layer of foam on the surface of said slurry in said digester vessel, said foam being generated by the liberation of gases by the reaction between said sulfuric acid and said ground phosphate rock; simultaneously supplying said sulfuric acid to said digester vessel in the above-mentioned addition step by applying said sulfuric acid onto the uppermost surface of said foam layer in a manner designed to minimize penetration therethrough; simultaneously slowly agitating said foam layer and said slurry, whereby the agitation provided thereto is gentle enough to aid in the distribution of the sulfuric acid in the foam layer and to keep the solids in the slurry phase suspended, but not so vigorous as to cause too rapid mixing of the sulfuric acid in the foam with the slurry phase; and recovering from said digester vessel a wet-process phosphoric acid product containing up to about 50 percent $P_2O_5$. In the instance wherein phosphate rock is premixed with weak phosphoric acid, said weak phosphoric acid recovered from the filtration step, such premixed material is fed into the digester beneath the foam layer. Furthermore, several new and advantageous features over the conventional process for the production of wet-process phosphoric acid are realized by the present invention.

Among these advantageous features are: a process for the direct production of the wet-process phosphoric acid of high concentration which eliminates the evaporation or concentration step, which requires a relatively short time for removal and recovery of the $P_2O_5$ values from the phosphate rock, which provides for easy separation of the $P_2O_5$ values as product acid, and which produces an acid containing a relatively low impurity content. In this process, which produces a stronger acid than that obtained in prior-art processes, no recirculation of the slurry is required, thereby reducing the complexity of the equipment. In addition, due to the shorter retention time and the stronger acid in the reactor, the equipment required is smaller and therefore cheaper. For instance, in the commercial process producing 400 tons of acid $P_2O_5$ per day at a concentration of 30 percent $P_2O_5$ using the customary 4 hours' retention time, 4 reaction tanks each of 25,000-gallon capacity (100,000 gallon total) would be required. We have found that using our invention to produce the same amount of acid $P_2O_5$ at an acid concentration, for example, of 40 percent $P_2O_5$ with a reaction time of 1 hour, one reaction tank of approximately 19,000 gallons would be required. In addition, in our process the control of the reactor operating conditions, such as temperature, feed rates of sulfuric acid and phosphate rock, and product acid concentration are less critical with respect to filtering rates obtained. Therefore, because of the inherent stability of our process, the use of more economical instrumentation is allowed and smoother uninterrupted operation at full capacity may be realized for a larger proportion of stream time.

It is therefore an object of the present invention to provide a process for the economical and direct production of a strong phosphoric acid containing up to about 50 percent $P_2O_5$ by means of a wet process without resorting to evaporation and without resorting to supplying external heat to the system for drying or calcining an intermediate product prior to quenching same in wash liquor.

Still further and more general objects of our invention are to provide a process for the direct production of strong phosphoric acid containing up to about 50 percent $P_2O_5$, which process requires a relatively short time for the removal and recovery of the $P_2O_5$ values from the phosphate rock, which process provides for easy separation of the $P_2O_5$ values as product acid, and which produces an acid containing relatively low impurity contents.

In carrying out the objects of our invention in one form thereof, we employ a process which comprises mixing phosphate rock with sulfuric acid in a digester vessel; alternately, the phosphate rock may be mixed with weak phosphoric acid in a premixer prior to introduction into the digester vessel. The phosphate rock and sulfuric acid added to said digester vessel form a slurry therein. We have found that the novel feature of our process is the use of a layer of foam on the surface of the slurry in the digester vessel to act as a distributor for the sulfuric acid and to aid in the formation of agglomerates of calcium sulfate hemihydrate crystals which filter well in the subsequent filtering operation. The foam is generated in our digester vessel by liberation of gases by the reaction between the sulfuric acid and the phosphate rock therein and has been considered in the past to be only a nuisance. In our process, the sulfuric acid is dripped or sprayed gently onto the foam in a manner designed to minimize penetration of the foam layer by the sulfuric acid. The foam and slurry are agitated gently to aid in distribution of the sulfuric acid in the foam layer and to keep the solids in the slurry layer suspended. We have found that vigorous agitation is to be avoided as it interferes with the formation of agglomerates of calcium sulfate, apparently by causing too rapid mixing of the sulfuric acid in the foam with the slurry phase. The role played by the layer of foam in the formation of agglomerates is not entirely understood. However, our tests have shown that introduction of the sulfuric acid through the foam layer, by use of a tube, directly into the slurry layer produces no agglomeration, even though great pains were taken to distribute the sulfuric acid rapidly and thoroughly as it was fed. The crystals produced when the sulfuric acid was added directly into the slurry layer were observed to be small single ones that filtered poorly. This led to our conclusion that some phenomena connected with the foam, in addition to distribution of acid by the foam, contributed to the agglomeration of calcium sulfate.

In our invention, the calcium sulfate is produced in the hemihydrate form rather than in the dihydrate form produced commercially. The hemihydrate is stable and gives no indication of hydrating during the filtering and washing of the cake.

Our invention, together with further objects and advantages thereof, will be better understood from a consideration of the following description taken in connection with the accompanying drawing in which:

The drawing is a flowsheet illustrating the principles of our novel process which results in the direct production of a strong phosphoric acid containing up to about 50 percent $P_2O_5$ and having the properties mentioned above.

Referring now more specifically to drawing, weak phosphoric acid is introduced via line 1 into premixer 3. Phosphate rock from a source not shown is also introduced into premixer 3 via line 2. A premixing device, shown generally as 4, may be employed to facilitate this operation. The phosphate rock is led via line 5 and means for control of flow 6 into digester vessel 7, wherein is maintained a slurry formed by the reaction between phosphate rock and sulfuric acid, generally illustrated as 8. Liberation of gases by the reaction between the sulfuric acid and the phosphate rock in slurry 8 causes the formation of the foam layer 9, which is maintained above the top surface of the slurry 8. In prior-art processes this foam layer, normally considered a nuisance, would be dispersed by means of addition of antifoam agent thereto. However, in our process, foam layer 9 of the desired thickness is maintained above slurry 8 by the addition of a controlled amount of an antifoam agent, and the sulfuric acid from a source not shown is applied gently via line 10 by either dripping or gentle spraying onto the top of foam layer 9 in a manner designed to minimize penetration of the foam layer by the sulfuric acid. We have discovered that a retention time of the slurry in digester vessel 7 of as little as 45 minutes is sufficient to effect the desired results. A mixing device, generally illustrated as mixing means 11 and 11A, gently agitates the slurry 8 and foam layer 9, respectively, to aid in distribution of the sulfuric acid in foam layer 9 and to keep the solids in slurry 8 suspended. After a retention time of approximately 45 minutes in the digester vessel 7, the reacted material is led via line 12 and means for control of flow 13 into the filtering and recovery device, generally illustrated as 14, from which phosphoric acid containing up to about 50 percent $P_2O_5$ is withdrawn as product via line 15.

In order that those skilled in the art may better understand how the present invention can be practiced, the following examples of processes which we have used in the direct production of strong phosphoric acid containing up to about 50 percent $P_2O_5$ of the character indicated herein are given by way of illustration and not by way of limitation.

EXAMPLE I

A number of small-scale tests were carried out employing a process generally shown by the flowsheet in the drawing. The tests were made using both batch and continuous operation with laboratory equipment. A beaker was used for a reaction vessel, and temperature was controlled by use of a water bath. A laboratory-type stirrer provided agitation. A Buchner funnel was used for filtration with two countercurrent washes, the last one being water. Sulfuric acid was fed dropwise to the reactor from a constant head feeder. Phosphate rock and weak phosphoric acid from the filtration step were premixed, and the mixture was fed to the reactor in increments by hand during continuous tests. In some of these tests small amounts of an antiform agent were used to control the foaming rate. The rock fed to the premixer analyzed approximately 30 to 32 percent $P_2O_5$. The sulfuric acid used in these small-scale tests contained approximately 93 percent $H_2SO_4$ and the product acids obtained using this apparatus analyzed approximately in the range from about 40 to 45 percent $P_2O_5$.

EXAMPLE II

Additional tests were carried out as in Example I above except that a continuous bench-scale type apparatus was employed rather than laboratory apparatus, thereby assuring closer similarity of operating conditions to the operating conditions employed in the apparatus shown in the drawing. The results of 4 of these bench-scale tests and the operating conditions under which they were carried out are given in Table I.

TABLE I

| | Type of extraction | | | |
|---|---|---|---|---|
| | Batch | | Continuous | |
| Test No. | 11 | 12 | 13 | ¹14 |
| Rock: | | | | |
| Analysis, percent: | | | | |
| $P_2O_5$ | 32.5 | 32.5 | 32.5 | 32.5 |
| CaO | 46.7 | 46.7 | 46.7 | 46.7 |
| Acid insoluble | 8.1 | 8.1 | 8.1 | 8.1 |
| Weight, g | 400 | 400 | | |
| Feed rate, g./min | | | 15 | 13.3 |
| Weak phosphoric acid: | | | | |
| Analysis, percent: | | | | |
| $P_2O_5$ | 30.2 | 30.2 | 29.4 | 30.2 |
| $SO_3$ | 1.7 | 1.7 | 1.6 | 1.4 |
| Weight, g | 700 | 700 | | |
| Feed rate, g./min | | | 33 | 30 |
| Sulfuric acid: | | | | |
| Concentration, percent $H_2SO_4$ | 93 | 93 | 93 | 93 |
| Weight, g | 315 | 315 | | |
| Feed rate: | | | | |
| G./min | 12 | 12 | 11.7 | 10.9 |
| G./g. rock | 0.79 | 0.79 | 0.78 | 0.82 |
| Extraction: | | | | |
| Temperature, °C.: | | | | |
| Maximum | 106 | 112 | | |
| Average | 88 | 107 | 90–95 | 90–95 |
| Time, min | 90 | 90 | 45 | 57 |
| Stirring rate, r.p.m. | 100 | 100 | 100 | 10 |
| Filtration: | | | | |
| Wash water, g./g. rock | 1.25 | 1.25 | 1.10 | 1.25 |
| Vacuum, in. of mercury | 15 | 15 | 15 | 15 |
| Rate: | | | | |
| Gal./(hr.) (sq. ft.) | 89 | 62 | 115 | 71 |
| Lb. $P_2O_5$/(hr.) (sq. ft.) | 76 | 52 | 87 | 55 |
| Product acid: | | | | |
| Analysis, percent: | | | | |
| $P_2O_5$ | 43.4 | 42.8 | 38.5 | 38 |
| $SO_3$ | 1.4 | | 0.5 | 1.0 |
| $P_2O_5$ recovery, percent | 93 | 92 | 93 | 96 |

¹ Filtration and $P_2O_5$ recovery data averaged from seven filtration batches.

EXAMPLE III

A number of additional tests were carried out employing a process generally shown in the flowsheet in the drawing and using the equipment referred to in Example II. The purpose of these tests was to observe the effect of adding the sulfuric acid to the top of the foam layer versus the direct addition of the sulfuric acid by means of pipes through the foam layer and directly to the slurry phase. The operating conditions and the results of two typical tests, one test being the addition of sulfuric acid as subfoam versus the addition of sulfuric acid by the superfoam method, are given in Table II.

TABLE II.—EFFECT OF ADDING $H_2SO_4$ SUBFOAM VERSUS SUPERFOAM IN BATCH TESTS

| | Test No. | |
|---|---|---|
| | 19, Subfoam | 27, Superfoam |
| Rock: | | |
| Analysis, percent: | | |
| $P_2O_5$ | 32.5 | 32.5 |
| CaO | 46.7 | 46.7 |
| Acid insoluble | 8.1 | 8.1 |
| Weight, g | 400 | 400 |
| Weak phosphoric acid: | | |
| Analysis, percent: | | |
| $P_2O_5$ | 33.5 | 33.5 |
| $SO_3$ | 1.8 | 1.8 |
| Weight, g | 700 | 700 |
| Sulfuric acid: | | |
| Concentration, percent $H_2SO_4$ | 93 | 93 |
| Weight, g | 350 | 350 |
| Feed rate, g./min | 13 | 13 |
| Extraction: | | |
| Temperature, °C.: | | |
| Maximum | 104 | 106 |
| Average | 94 | 91 |
| Time, min | 90 | 90 |
| Stirring rate, r.p.m. | 50 | 50 |
| Filtration: | | |
| Wash water, g./g. rock | 1.0 | 1.0 |
| Vacuum, in. of mercury | 15 | 15 |
| Rate: | | |
| Gal./(hr.) (sq. ft.) | 5 | 58 |
| Lb. $P_2O_5$/(hr.) (sq. ft.) | 4 | 53 |
| Product acid: | | |
| $P_2O_5$ content, percent | 41.5 | 41.2 |
| $P_2O_5$ recovery, percent | 95 | 91 |

EXAMPLE IV

The effect of extraction temperature was investigated over the range of about 50° to 105° C. Test 1A was made by a procedure that has been adopted as standard. The weak acid was preheated to 100° C. before the rock was added. The resulting slurry, which was at a temperature of 80° C., was placed in an air bath at 135° C. and sulfuric acid was added over a 30-minute period. The temperature of the slurry rose to a maximum of 108° C. during this period and then decreased to 78° C. over the next hour. The filtering rate was 52 gallons per hour per square foot of filter area and $P_2O_5$ recovery was 92.4 percent.

Attempts were made in subsequent tests to carry out the entire extraction (90 minutes) at constant temperatures. The recycle acid was not preheated in these tests. The extractions in tests 2A, 3A, and 4A were carried out in a water bath. In test 2A, the extraction temperature varied between 98° and 103° C., the filtering rate was 30, the calcium sulfate was in the form of the heimhydrate, and the recovery of $P_5O_2$ was 92 percent. In test 3A, the extraction temperature varied between 60° C. and 78° C., the calcium sulfate was in the form of the hemihydrate, the filtering rate was 33, and the recovery of $P_2O_5$ was 94.7 percent. In test 4A, the extraction temperature varied between 50° C. and 60° C., 75 percent of the calcium sulfate in the washed cake was in the form of the dihydrate, the filtering rate was 13, and the recovery of $P_2O_5$ was 92.3 percent. The filter cake in this test set up into a solid mass, which indicated that at least part of the dihydrate was formed while washing the cake. The results of these tests are given in Table III.

The data show that the temperature of extraction had no significant effect on the recovery of $P_2O_5$ within the range investigated. The extremely low filtering rate for test 4A probably was due to some hydration of the hemihydrate during washing.

EXAMPLE V

*Effect of proportion of sulfuric acid*

The amount of sulfuric acid used in many tests has been the stoichiometric equivalent of the CaO content of the rock. Since the weak phosphoric acid also contained some free sulfuric acid, the $SO_3$ content of the product acid has ranged from 2 to 4 percent. A series of tests was made to determine the effect on $P_2O_5$ recovery of using less sulfuric acid. Duplicate tests were made with the addition of 100, 95, and 90 percent of the stoichiometric equivalent of sulfuric acid.

Decreasing the amount of sulfuric acid by 10 percent had little effect on the recovery of $P_2O_5$. The change, however, increased the filtering rate from 50 to 80, increased the $P_2O_5$ content of the product acid from 41 to 43 percent, and decreased the $SO_3$ content of the product acid from 3.8 to 1.4 percent. The results of these tests are given in Table IV.

TABLE IV.—PRODUCTION OF WET-PROCESS PHOSPHORIC ACID [1]—EFFECT OF AMOUNT OF SULFURIC ACID

| Test No. | $H_2SO_4$ (93%) | | Temperature of slurry, °C. | | Filtering rate, gal./ (hr.) (sq. ft.) | Combined $H_2O$ in cake, percent [2] | Product acid | | |
|---|---|---|---|---|---|---|---|---|---|
| | | | | | | | $P_2O_5$, percent | | $SO_3$ content, percent |
| | Grams | CaO equivalent, percent | Max. | Final | | | Content | Recovery | |
| 1B | 350 | 100 | 108 | 78 | 52 | 6.1 | 39.9 | 92.4 | 3.8 |
| 2B | 350 | 100 | 109 | 75 | 48 | | 41.9 | 91.5 | |
| Average | | | | | 50 | | 40.9 | 91.9 | |
| 3B | 330 | 95 | 108 | 76 | 71 | 6.7 | 41.4 | 93.5 | 2.9 |
| 4B | 330 | 95 | 106 | 84 | 58 | 6.3 | 40.8 | 95.0 | 2.8 |
| Average | | | | | 74 | | 41.1 | 94.2 | |
| 5B | 315 | 90 | 106 | 78 | 89 | 6.8 | 43.4 | 92.7 | 1.4 |
| 6B | 315 | 90 | 106 | 78 | 74 | 6.8 | 42.8 | 93.7 | |
| Average | | | | | 81 | | 43.1 | 93.2 | |

[1] Rock, 400 g.; weak phosphoric acid ($P_2O_5$, 30.2%; $SO_3$, 1.7%), 700 g.; $H_2SO_4$ added to the foam at the rate of 6 ml./min.; Antifoam HF (12 to 15 drops) added to the foam dropwise as needed; stirring rate, 100 r.p.m. (interface between foam and slurry was not stirred); extraction time, 90 min.
[2] $CaSO_4 \cdot 1/2H_2O$ contains 6.2% combined water.

EXAMPLE VI

*Effect of proportion of weak phosphoric acid*

In a number of the small-scale tests carried out, as noted above, 700 grams of weak phosphoric acid (30 percent $P_2O_5$) had been used. The effect of this series of tests was to determine the effect of the proportions of weak phosphoric acid and in these tests the proportion of weak phosphoric acid was increased from 700 grams TABLE III.—PRODUCTION OF WET-PROCESS PHOSPHORIC ACID [1]—EFFECT OF EXTRACTION TEMPERATURE

| Test No. | Bath | | Temperature of slurry, °C. | | | Filtering rate, gal./(hr.) (sq. ft.) | Combined $H_2O$ in cake, percent [2] | $P_2O_5$ in product acid, percent | |
|---|---|---|---|---|---|---|---|---|---|
| | Kind | Temp., °C. | Initial | Max. | Final | | | Content | Recovery |
| 1A | Air | 135 | 80 | 108 | 78 | 52 | 6.1 | 39.9 | 92.4 |
| 2A | Water | 100 | 99 | 103 | 98 | 30 | 6.4 | 40.3 | 92.0 |
| 3A | do | 70 | 60 | 78 | 66 | 33 | 6.6 | 38.2 | 94.7 |
| 4A | do | 50 | 50 | 62 | 50 | 13 | 17.3 | 38.7 | 92.3 |

[1] Rock, 400 g.; weak phosphoric acid ($P_2O_5$, 30.2%; $SO_3$, 1.7%), 700 g.; $H_2SO_4$ (93%), 350 g. added to the foam at the rate of 6 ml/. min.; Antifoam HF (3 to 19 drops) added to foam dropwise as needed; stirring rate, 100 r.p.m. (interface between foam and slurry was not stirred); extraction time, 90 min.
[2] $CaSO_4 \cdot 1/2H_2O$ contains 6.2% and $CaSO_4 \cdot 2H_2O$ contains 21% combined water.

up to 875 grams—an amount that contains enough phosphoric acid to convert all of the $P_2O_5$ in the rock to monocalcium phosphate. This increase in weak acid did show a significant change in either the filtering rate, the strength of the product, or the recovery of $P_2O_5$. The results of these tests are shown in Table V.

TABLE V.—PRODUCTION OF WET-PROCESS PHOSPHORIC ACID[1]—EFFECT OF AMOUNT OF WEAK PHOSPHORIC ACID (30% $P_2O_5$)

| Test No. | Weak $H_3PO_4$ (30.2% $P_2O_5$), g. | Filtering rate, gal./(hr.) (sq. ft.) | Combined $H_2O$ in cake, percent | $P_2O_5$ in product acid, Percent | |
|---|---|---|---|---|---|
| | | | | Content | Recovery |
| 1C | 700 | 89 | 6.8 | 43.4 | 92.7 |
| 2C | 700 | 74 | 6.8 | 42.8 | 93.7 |
| Average | | 81 | | 43.1 | 93.2 |
| 3C | 875 | 62 | 6.7 | 40.7 | 95.5 |
| 4C | 875 | 67 | 6.8 | 41.3 | 94.8 |
| Average | | 64 | | 41.0 | 95.1 |

[1] Rock, 400 g.; $H_2SO_4$ (93%), 315 g. added to foam at the rate of 6 ml./min.; Antifoam HF (6 to 15 drops) added dropwise as needed; stirring rate, 100 r.p.m. extraction time, 90 min.; extraction temperature, 106°–108° C. (maximum), 74°–78° C. (final).

EXAMPLE VII

Variable in our process

After considering the results of numerous small- and large-scale tests carried out in developing the optimum conditions for our process, we have settled upon the most likely range of such variables as the weak phosphoric acid, sulfuric acid feed rate, extraction time, extraction temperature, and the degree of agitation. Although we do not wish to be specifically limited to these variable enumerated infra, we do wish to recite them in an effort to more fully disclose our findings and to enable others skilled in the art to practice our process. The results of our conclusions relating to the permissible and preferred ranges of such variables are found in Table VI.

TABLE VI.—VARIABLES IN THE PROCESS

| Variable | Range | |
|---|---|---|
| | Permissible | Preferred |
| Weak phosphoric acid: | | |
| Concentration, percent $P_2O_5$ | 20–40 | 29–33 |
| Rate, g./g. rock (32.5% $P_2O_5$) | 1.4–2.8 | 1.75–2.25 |
| Sulfuric acid rate: | | |
| Mole ratio, $H_2SO_4$:CaO (rock) | 0.8–1.2 | 0.95–1.0 |
| $H_2SO_4$ (93%), g./g. rock (32.5% $P_2O_5$) | 0.69–1.01 | 0.83–0.88 |
| Extraction: | | |
| Temperature, ° C | 70–115 | 95–105 |
| Time, min | 30–120 | 45–60 |
| Stirring rate: | | |
| R.p.m. | 50–300 | 75–125 |
| Peripheral speed, ft./min | 50–300 | 75–125 |

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. A process for the direct manufacture of concentrated wet-process type phosphoric acid in which ground phosphate rock is reacted with sulfuric acid, and calcium sulfate hemihydrate is produced as a byproduct, which comprises the steps of simultaneously introducing ground phosphate rock and weak phosphoric acid into a premixer vessel, said weak phosphoric acid introduced from a later-mentioned filtering step; mixing said ground phosphate rock and said weak phosphoric acid in said premixing vessel; introducing said mixed phosphate rock and weak phosphoric acid into a slurry and beneath a layer of foam maintained over the surface of said slurry in a digester vessel, said slurry and said foam from later-mentioned slurry and foam maintenance steps, respectively; maintaining in said digester vessel a slurry resulting from the reaction of sulfuric acid, said weak phosphoric acid and said phosphate rock, said sulfuric acid introduced into said digester vessel from a later-mentioned addition step; maintaining a layer of foam on the surface of said slurry in said digester vessel, said foam being generated by the liberation of gases by the reaction between said sulfuric acid and said ground phosphate rock; simultaneously supplying said sulfuric acid to said digester vessel in the above-mentioned addition step by applying said sulfuric acid onto the upper surface of said foam layer in a manner designed to minimize penetration therethrough; simultaneously slowly agitating said foam layer and said slurry whereby the agitation provided thereto is gentle enough to aid in the distribution of said sulfuric acid in said foam layer and to keep the solids in said slurry suspended, but not so vigorous as to cause rapid mixing of the sulfuric acid in the foam with the slurry phase removing said slurry from said digester vessel; filtering said removed slurry; returning weak phosphoric acid from the above-mentioned filter step to said premixer vessel; and recovering from said filtering step a wet-process phosphoric acid product containing up to about 50 percent $P_2O_5$, said process characterized by the fact that the calcium sulfate byproduct crystals therefrom are produced substantially in the hemihydrate form, said hemihydrate form being stable and resistive to hydration during the subsequent filtering and washing thereof.

2. A process for the direct manufacture of concentrated wet-process type phosphoric acid in which ground phosphate rock is reacted with sulfuric acid, and calcium sulfate hemihydrate is produced as a byproduct, which comprises the steps of simultaneously introducing ground phosphate rock and weak phosphoric acid into a premixer vessel, said weak phosphoric acid introduced from a later-mentioned filtering step; mixing said ground phosphate rock and said weak phosphoric acid in said premixing vessel; introducing said mixed phosphate rock and weak phosphoric acid into a slurry and beneath a layer of foam maintained over the surface of said slurry in a digester vessel, said slurry and said foam from later-mentioned slurry and foam maintenance steps, respectively; maintaining in said digester vessel a slurry resulting from the reaction of said phosphate rock, said weak phosphoric acid and sulfuric acid, said sulfuric acid introduced into said digester vessel from a later-mentioned addition step; maintaining a layer of foam on the surface of said slurry in said digester vessel, said foam being generated by the liberation of gases by the reaction between said sulfuric acid and said phosphate rock; simultaneously supplying said sulfuric acid to said digester vessel at a mole ratio of $H_2SO_4$:CaO (rock) in the range from about 0.8 to about 1.2 in the above-mentioned addition step by applying said sulfuric acid onto the upper surface of said foam layer; simultaneously slowly agitating said foam layer and said slurry; maintaining the slurry in said digester vessel at a temperature in the range of about 70° C. to about 115° C.; retaining said slurry in said digester vessel for a period of time ranging from about 30 minutes to about 120 minutes removing said slurry from said digester vessel; filtering said removed slurry; returning weak phosphoric acid from the above-mentioned filter step to said premixer vessel, and recovering from said filtering step a wet-process phosphoric acid product containing up to about 50 percent $P_2O_5$, said process characterized by the fact that the calcium sulfate byproduct crystals therefrom are produced substantially in the hemihydrate form, said hemihydrate form being stable and resistive to hydration during the subsequent filtering and washing thereof.

3. A process for the direct manufacture of concentrated wet-process type phosphoric acid in which ground phosphate rock in reacted with sulfuric acid, and calcium sulfate hemihydrate is produced as a byproduct, which comprises the steps of simultaneously introducing ground phosphate rock and weak phosphoric acid into a premixer vessel, said weak phosphoric acid introduced from a later-mentioned filtering step; mixing said ground phosphate rock and said weak phosphoric acid in said pre-mixing vessel; introducing said mixed phosphate rock and weak phosphoric acid into a slurry and beneath a layer of foam maintained over the surface of said slurry in a digester vessel, said slurry and said foam from later-mentioned slurry and foam maintenance steps, respectively; maintaining in said digester vessel a slurry resulting from the reaction of said phosphate rock, said weak phosphoric acid and sulfuric acid, said sulfuric acid introduced into said digester vessel from a later-mentioned addition step; maintaining a layer of foam on the surface of said slurry in said digester vessel, said foam being generated by the liberation of gases by the reaction between said sulfuric acid and said phosphate rock; simultaneously supplying said sulfuric acid to said digester vessel at a mole ratio of $H_2SO_4$:CaO (rock) in the range from about 0.95 to about 1.0 in the above-mentioned addition step by applying said sulfuric acid onto the upper surface of said foam layer; simultaneously slowly agitating said foam layer and said slurry; maintaining the slurry in said digester vessel at a temperature in the range of about 95° C. to about 115° C.; retaining said slurry in said digester vessel for a period of time ranging from about 45 minutes to about 60 minutes, removing said slurry from said digester vessel; filtering said removed slurry; returning weak phosphoric acid from the above-mentioned filter step to said premixer vessel; and recovering from said filtering step a wet-process phosphoric acid product containing up to about 50 percent $P_2O_5$, said process characterized by the fact that the calcium sulfate byproduct crystals therefrom are produced substantially in the hemihydrate form, said hemihydrate form being stable and resistive to hydration during the subsequent filtering and washing thereof.

4. A process for the direct manufacture of concentrated wet-process type phosphoric acid in which ground phosphate rock in reacted with sulfuric acid, and calcium sulfate hemihydrate is produced as a byproduct, which comprises the steps of simultaneously introducing ground phosphate rock and weak phosphoric acid into a premixer vessel, said weak phosphoric acid introduced from a later-mentioned filtering step; mixing said ground phosphate rock and said weak phosphoric acid in said pre-mixing vessel; introducing said mixed phosphate rock and weak phosphoric acid into a slurry and beneath a layer of foam maintained over the surface of said slurry in a digester vessel, said slurry and said foam from later-mentioned slurry and foam maintenance steps, respectively; maintaining in said digester vessel a slurry resulting from the reaction of said phosphate rock, said weak phosphoric acid and sulfuric acid, said sulfuric acid introduced into said digester vessel from a later-mentioned addition step; maintaining a layer of foam on the surface of said slurry in said digester vessel, said foam being generated by the liberation of gases by the reaction between said sulfuric acid and said phosphate rock; simultaneously supplying said sulfuric acid to said digester vessel at a mole ratio of $H_2SO_4$:CaO (rock) in the range from about 0.95 to about 1.0 in the above-mentioned addition step by applying said sulfuric acid onto the upper surface of said foam layer; simultaneously slowly agitating said foam layer and said slurry at a rate such that the peripheral speed is in the range from about 50 feet per minute to about 300 feet per minute; maintaining the slurry in said digester vessel at a temperature in the range of about 95° C. to about 115° C.; retaining said slurry in said digester vessel for a period of time ranging from about 45 minutes to about 60 minutes, removing said slurry from said digester vessel; filtering said removed slurry; returning weak phosphoric acid from the above-mentioned filter step to said premixer vessel; and recovering from said filtering step a wet-process phosphoric acid product containing up to about 50 percent $P_2O_5$, said process characterized by the fact that the calcium sulfate byproduct crystals therefrom are produced substantially in the hemihydrate form, said hemihydrate form being stable and resistive to hydration during the subsequent filtering and washing thereof.

5. A process for the direct manufacture of concentrated wet-process type phosphoric acid in which ground phosphate rock is reacted with sulfuric acid, and calcium sulfate hemihydrate is produced as a byproduct, which comprises simultaneously introducing ground phosphate rock and weak phosphoric acid into a premixer vessel, said weak phosphoric acid introduced from a later-mentioned filtering step; mixing said ground phosphate rock and said weak phosphoric acid in said premixer vessel; introducing said mixed phosphate rock and weak phosphoric acid into a slurry and beneath a layer of foam maintained over the surface of said slurry in a digester vessel, said slurry and said foam from later-mentioned slurry and foam maintenance steps, respectively; maintaining in said digester vessel a slurry resulting from the reaction of said phosphate rock, said weak phosphoric acid, and sulfuric acid, said sulfuric acid introduced into said digester vessel from a later-mentioned addition step; maintaining a layer of foam on the surface of said slurry in said digester vessel, said foam being generated principally by the liberation of gases by the reaction between said sulfuric acid and said phosphate rock; simultaneously supplying said sulfuric acid to said digester vessel in the above-mentioned addition step by applying said sulfuric acid onto the upper surface of said foam layer; simultaneously slowly agitating said foam layer and said slurry; removing said slurry from said digester vessel; filtering said removed slurry; returning said weak phosphoric acid from the above-mentioned filtering step to said premixer vessel; and recovering from said filtering step a wet-process phosphoric acid product containing up to about 50 percent $P_2O_5$, said process characterized by the fact that the calcium sulfate byproduct crystals therefrom are produced substantially in the hemihydrate form, said hemihydrate form being stable and resistive to hydration during the subsequent filtering and washing thereof.

(References on following page)

References Cited

UNITED STATES PATENTS

| | | | |
|---|---|---|---|
| 1,880,544 | 10/1932 | Waggaman | 23—165 |
| 2,504,544 | 4/1950 | Legal et al. | 23—165 |
| 2,698,219 | 12/1954 | Martin | 23—165 |
| 2,885,263 | 5/1959 | Peet | 23—165 |

OSCAR R. VERTIZ, *Primary Examiner.*

H. S. MILLER, *Assistant Examiner.*